US006599636B1

(12) United States Patent
Alger

(10) Patent No.: US 6,599,636 B1
(45) Date of Patent: Jul. 29, 2003

(54) $\alpha$-$AL_2O_3$ AND $TI_2O_3$ PROTECTIVE COATINGS ON ALUMINIDE SUBSTRATES

(76) Inventor: Donald L. Alger, 4050 Paradise Rd., Seville, OH (US) 44273

( * ) Notice: Subject to any disclaimer, the term of this patent is extended or adjusted under 35 U.S.C. 154(b) by 271 days.

(21) Appl. No.: 09/703,239

(22) Filed: Oct. 31, 2000

(51) Int. Cl.[7] .............................. B32B 15/04; C23C 8/00
(52) U.S. Cl. ....................... 428/472; 428/469; 428/701; 428/702; 428/938; 427/255.26; 427/255.29; 148/280; 148/275; 148/285; 148/281
(58) Field of Search .......................... 427/255.4, 255.26, 427/255.29; 428/936, 938, 701, 702, 469, 472, 472.2; 148/280, 275, 285, 281, 240

(56) References Cited

U.S. PATENT DOCUMENTS 5,413,642 A * 5/1995 Alger
5,599,404 A * 2/1997 Alger
5,620,754 A * 4/1997 Turchan et al.

* cited by examiner

*Primary Examiner*—Deborah Jones
*Assistant Examiner*—Jennifer McNeil
(74) *Attorney, Agent, or Firm*—Fay, Sharpe, Fagan, Minnich & McKee, LLP

(57) ABSTRACT

A titanium aluminide substrate (4) is vulnerable to air oxidation, limiting the use of this substrate in a variety of industrial applications, including the aircraft and aerospace industries. A bilayer reactive barrier (2) is formed on a titanium aluminide substrate. The barrier layer includes an $\alpha$-$Al_2O_3$ layer (6) from the reaction of oxygen from the disassociation of water with alumina in a gaseous and water vapor atmosphere at high temperatures and low oxygen concentration. During the process, titanium migrates through the $\alpha$-$Al_2O_3$ to a gas/barrier layer surface (14) and is oxidized to form a $Ti_2O_3$ layer (8). A surface of the $Ti_2O_3$ layer is subsequently oxidized to form a $TiO_2$ layer (12). In this manner, a triple layer barrier is formed in which the immersible $TiO_2$ and $\alpha$-$Al_2O_3$ are separated by $Ti_2O_3$. The three layers are bonded to each with a bond strength greater than 4500 kPa.

29 Claims, 4 Drawing Sheets

α-AL₂O₃ AND TI₂O₃ PROTECTIVE COATINGS ON ALUMINIDE SUBSTRATES

BACKGROUND OF THE INVENTION

The present invention relates to processes for forming barrier layers on metal surfaces. It finds particular application in conjunction with forming barrier layers on titanium and aluminum containing substrates, particularly titanium aluminides, which resist oxidation, resist corrosion, resist wear and abrasion, and resist corrosive media.

Titanium aluminide is currently being investigated to replace super alloys for use in aircraft turbine engines and aircraft structures. Titanium aluminide is about half the density of superalloys of comparable strength, so a large reduction in aircraft weight is possible. The titanium aluminide alone is quite brittle, but workers have been able to add other elements to reduce this brittleness. A remaining development problem is that the oxidation resistance of these titanium aluminide compounds is lower than desired at elevated temperature. Therefore, a key factor in increasing the maximum use temperature is the enhancement of oxidation resistance while maintaining creep and strength performance.

Previous attempts to develop a protective coating have resulted in coatings which are unstable or tend to peel off. If a titanium aluminide substrate is oxidized in air or oxygen at high temperature, as is conventionally done, $Al_2O_3$ and $TiO_2$ are formed. These two oxides have different structures and are immiscible in each other. As such, the mixed oxide is porous and weakly bonded to the substrate. Therefore, they are subject to spallation from the substrate. As such, the oxides are not an effective oxygen barrier. That is, they do not prevent the diffusion of oxygen into the substrate and the reaction of oxygen with aluminum, titanium, and other elements below the surface.

The present invention relates to a new and improved technique for forming strongly-bonded surface barriers for titanium aluminide substrates, which overcomes the above-referenced problem, and to the structures produced by such a technique.

SUMMARY OF THE INVENTION

In accordance with one aspect of the present invention, a process for the formation of a specific reactive element bilayer barrier on a titanium aluminide substrate is described. The bilayer barrier comprises an oxide coating formed from the reaction of specific reactive elements within the substrate with oxygen from water vapor in the presence of hydrogen at high temperatures and low oxygen concentrations. This coating is formed by placing at least a surface and contiguous regions of a titanium aluminide material in a gaseous atmosphere with a small concentration of water vapor at a high temperature. That temperature and water vapor concentration are then maintained throughout the oxide formation. The specific reactive elements at the substrate surface are reacted with oxygen from the gaseous hydrogen/water vapor atmosphere to form the bilayer barrier. The barrier layer is strongly bonded to the surface with an aluminum oxide at a substrate/barrier layer interface and a titanium oxide at a barrier layer/gaseous interface.

In accordance with another aspect of the present invention, the product of the process described above is provided. The product is a bilayer oxide coating on a titanium aluminide substrate. The bilayer oxide coating comprises an aluminum oxide layer on the substrate/barrier layer interface and a titanium oxide layer on the barrier layer/substrate interface.

One advantage of the present invention is that it provides a barrier that is resistant to permeation by oxygen.

Another advantage of the present invention is that it forms a barrier which resists wear.

Yet another advantage of the present invention is that it forms a surface barrier which inhibits erosion.

Still another advantage resides in the strong adhesion of a barrier layer to a titanium aluminide substrate.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not be construed as limiting the invention.

DETAILED DESCRIPTION OF THE PREFERRED EMBODIMENTS

The present application describes the structure and formation of a reactive barrier on the surface of a titanium aluminide substrate. A higher concentration of the specific reactive elements is brought to the surface, and a highly stable oxide of the specific reactive element is formed on the surface of the titanium aluminide substrate. The preferred specific reactive elements present in the immediate invention include aluminum, titanium, and mixtures thereof.

In one embodiment of the present invention, the reactive barrier coating is formed on the surface of the titanium aluminide substrate in a low-oxygen environment. The substrate is heated to an elevated temperature, preferably between about 870 and about 1050° C., in an environment of hydrogen, with a partial pressure of water vapor, preferably about 1 to about 750 ppm, and more preferably between about 1 to about 500 ppm. The temperature is between about 550 and about 1100° C. At this temperature and pressure, all non-specific reactive elements on the surface are reduced. As the less stable surface oxides are reduced by hydrogen, aluminum and titanium atoms are exposed to the fresh oxygen produced by the dissociation of the water vapor and from the dissociation of less stable surface metal oxides which have formed on the substrate. These aluminum and titanium atoms react with the oxygen to produce strong stable aluminum and titanium oxides. These specific reactive element oxides are too stable to be reduced by the hydrogen/water vapor atmosphere.

The preferred process heats the titanium aluminide specimens in a hydrogen atmosphere that contains between about 1 and about 500 ppm of water vapor. Some substrates may take up hydrogen at lower temperatures. Therefore, in those cases, after processing the substrates in the temperature range of about 870 and 1050° C., and upon cooling the furnace down to about 815° C., the hydrogen atmosphere is evacuated from the furnace and the cool down process is continued in a vacuum that contains less than 1 ppm of water vapor. Alternatively, the furnace is backfilled with an inert gas that contains less than 1 ppm of water vapor as the furnace is cooled to room temperature.

Figure 1:
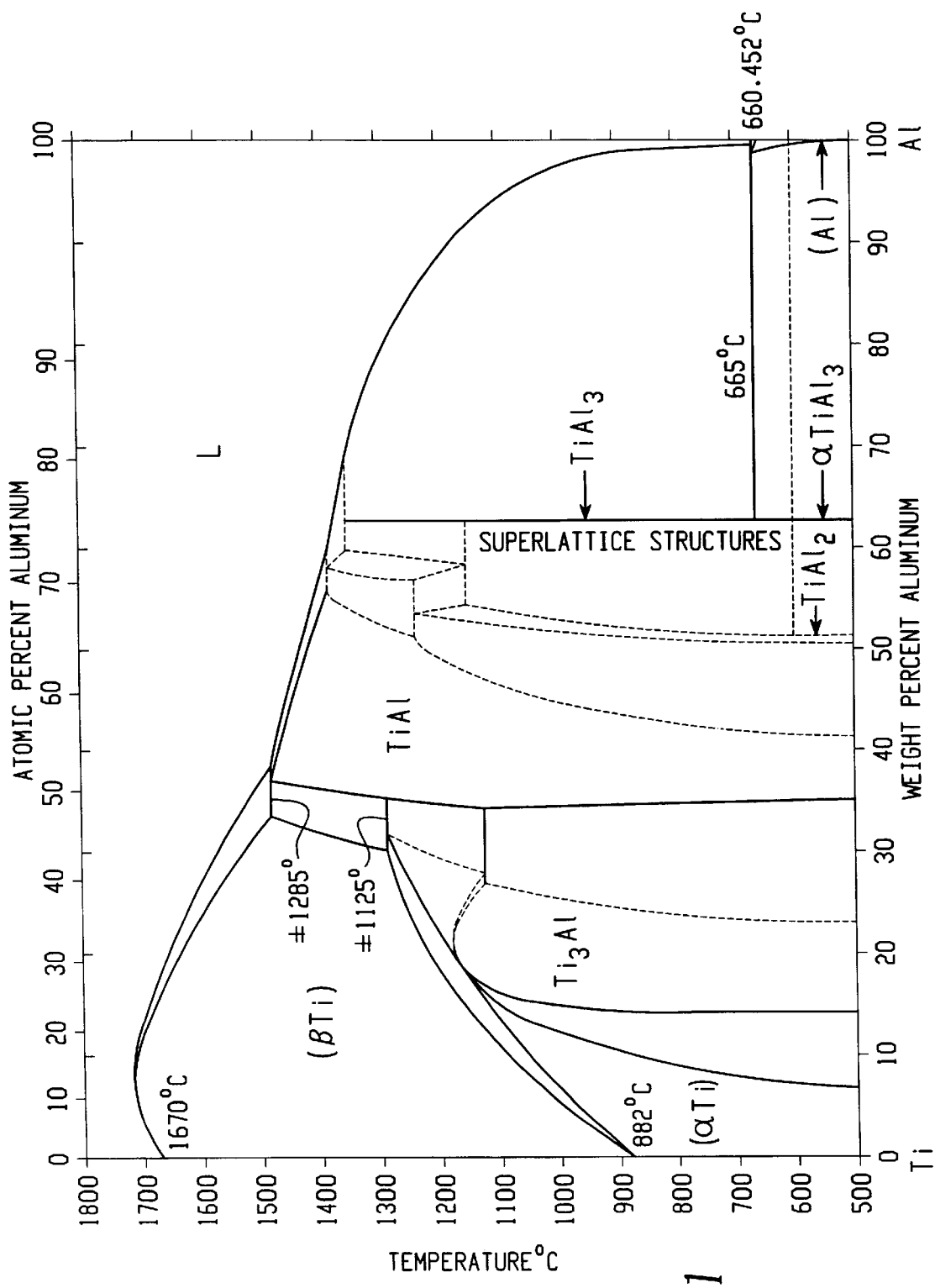
FIG. 1 is a Ti—Al phase diagram, giving a graphic description of the weight percent (atomic percent) of aluminum vs. temperature (° C.) in typical Ti—Al substrates.

In one embodiment of the present invention, the substrate upon which the reactive barrier is formed is a titanium aluminide substrate. The phase diagram of titanium aluminides is shown in FIG. 1. As can be seen, titanium aluminide substrates have attractive elevated-temperature properties and low density typical of intermetallic compounds. These attributes make titanium aluminide materials very interesting for both engine and airframe applications. These advanced materials are key to technological advancements, and enhanced structural materials are particularly vital to advanced aerospace systems.

Intermetallic compounds, such as titanium aluminide, are defined as having an ordered alloy phase between two metallic elements. An alloy phase is ordered if two or more sublattices are required to describe its atomic structure. The ordered structure of intermetallic compounds exhibits attractive elevated-temperature properties, i.e. strength, stiffness, etc., because of the long-range ordered super-lattice that reduces dislocation mobility and diffusion properties at elevated temperature. The reduced dislocation motion also results in fracture toughness at extremely low ambient temperature.

The immediate process of forming protective oxide coatings on titanium aluminides is effective for all aluminide compounds. This includes the phases β-Ti, $Ti_3Al$, γ-TiAl, and $TiAl_3$. Because of their low density, the ordered intermetallic titanium aluminides, especially γ-titanium aluminide (TiAl) and α-2-titanium aluminide ($Ti_3Al$), are particularly attractive candidates for applications in advanced aerospace engine and airframe components, in both monolithic and composite concepts. A comparison of the characteristics of monolithic titanium aluminides with other aluminides and superalloys is shown in Table 1.

TABLE 1

Melting Points and Densities for Aluminides

| Aluminide | Melting Point (° C.) | Density (gm $cm^{-3}$) |
|---|---|---|
| $Ti_3Al$ | 1600 | 4.2 |
| TiAl | 1460 | 3.9 |
| $Fe_3Al$ | 1540 | 6.7 |
| FeAl | 1330 | 5.6 |
| $Ni_3Al$ | 1390 | 7.5 |
| NiAl | 1640 | 5.9 |
| Superalloys (typical) | 1325–1400 | 9 |

In a preferred embodiment, the titanium aluminide substrate is γ-TiAl, that has been modified by the addition of other elements to improve the mechanical properties of the aluminide substrate. The modified γ-TiAl, which has a density of 3.9 g/$cm^3$, less than half the density of typical superalloys is also advantageous. Furthermore, the modified γ-TiAl has a melting point of about 1460° C., a temperature well above the process temperature required to form the protective oxide coatings of the present invention.

Also preferred are titanium aluminide ternary alloys consisting of Ti—Al—X, where X can be elements such as Cr, Nb, Mn, Mo, W, and V. Some examples of these titanium aluminide ternary alloys are Ti-49Al-2W (atomic %), Ti-44Al-2Mo, and Ti-47Al-29V. Also included in this system are titanium aluminide quaternary alloys consisting of Ti—Al—Nb—Y where Y equals Cr or Mn. In general, the processes for forming oxide barrier layers on titanium and aluminum containing substrates relates to all titanium aluminide ternary and quaternary and higher level alloys that contain elements that have been added to produce certain desirable mechanical improvements to the substrate.

Alternatively, the oxide coatings may be formed on other titanium and aluminum containing substrates. Included is the titanium-aluminum system consisting of the titanium-aluminum alloy disordered alpha phase (α-TiAl) and beta phase (β-TiAl). Superalloys, and other alloys, metals, and materials that contain about 2% or more of aluminum and about 2% or more of titanium are also suitable as substrates upon which to form the protective oxides formed by the present invention.

Figure 2:
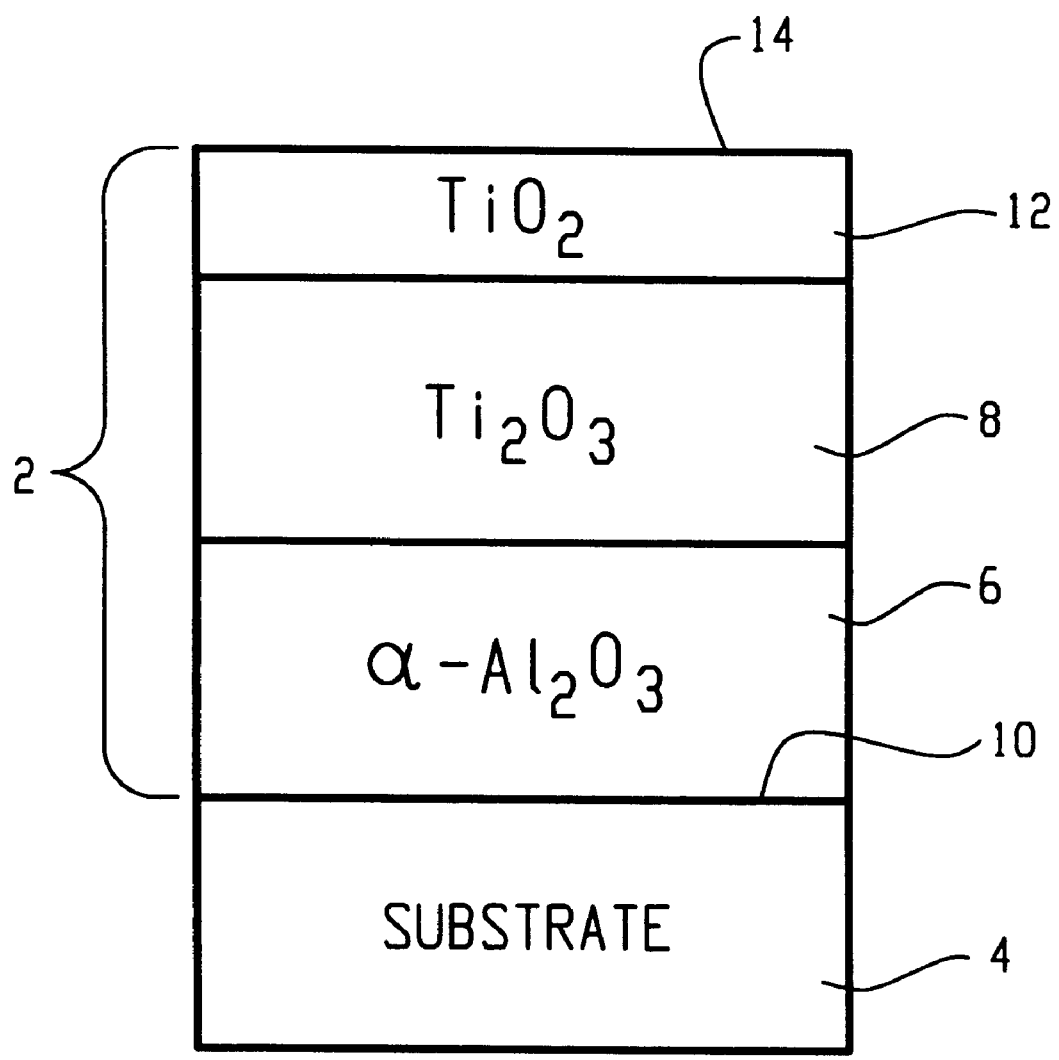
FIG. 2 is a drawing illustrating the multilayer characteristics of the oxide coating.

With reference to FIG. 2, a reactive barrier 2 is formed which is a specific reactive element oxide. A titanium aluminide substrate 4 is modified such that the surface of the substrate forms a specific reactive element oxide film that resists corrosion, permeation by hydrogen isotopes, and serves other useful functions. This oxide protective coating 2 is formed because the intermediate titanium oxide, $Ti_2O_3$, not $TiO_2$, is formed with the α-$Al_2O_3$. In the low-pressure, high temperature oxygen region provided by the process used, there exists a high solid solubility between both α-$Al_2O_3$ and $Ti_2O_3$ phases. The two oxide phases have similar lattice constants and the same crystalline structure.

The equilibrium pressure for the formation of α-$Al_2O_3$ is below the equilibrium pressure for the formation of $Ti_2O_3$ so that an α-$Al_2O_3$ layer 6, the more stable oxide, forms directly on the substrate 4 in preference to a $Ti_2O_3$ enriched layer 8. In this atmosphere and at process temperature, both aluminum and titanium atoms diffuse from the bulk substrate to the substrate surface, react with the oxygen present there, and form their respective oxides. However, α-$Al_2O_3$ is the most stable oxide and bonds strongly to the substrate 4. The titanium oxide on the substrate surface is reduced to titanium by the more reactive aluminum metal present at the surface. As the α-$Al_2O_3$ layer 6 grows thicker on the substrate 4 surface, the titanium atoms, reduced from the titanium oxide by the aluminum, diffuse outward toward the oxide/gas interface where they form the oxide, $Ti_2O_3$ layer 8. A distinct separation between the α-$Al_2O_3$ and $Ti_2O_3$ phases occurs. α-$Al_2O_3$ concentrates at an oxide/substrate interface 10 and $Ti_2O_3$ concentrates at an oxide/gas interface 12. The $Ti_2O_3$ serves to provide a graded interface to reduce the stress caused by any tensile force applied to try and pull the oxide away from the substrate.

When the newly formed oxide coating is then put in air at high temperature and atmospheric pressure as it typically is in an application, a thin coating of $TiO_2$ is formed on the previous gas/oxide interface 12. Since the prior surface coating is mostly $Ti_2O_3$, an intermediate titanium oxide, a thin surface layer of $Ti_2O_3$ converts to the layer of fully oxidized $TiO_2$ in air. The amount of $TiO_2$ is insignificant in relation to the amount of $Ti_2O_3$ formed. ESCA analysis shows the $TiO_2$ coating is actually very thin, on the order of a few nanometers. The $TiO_2$ coating exists only at the surface of the oxide coating, with a relatively thick graded layer of $Ti_2O_3$ existing between the $TiO_2$ layer 14 and the α-$Al_2O_3$/substrate interface 10.

Figure 3:
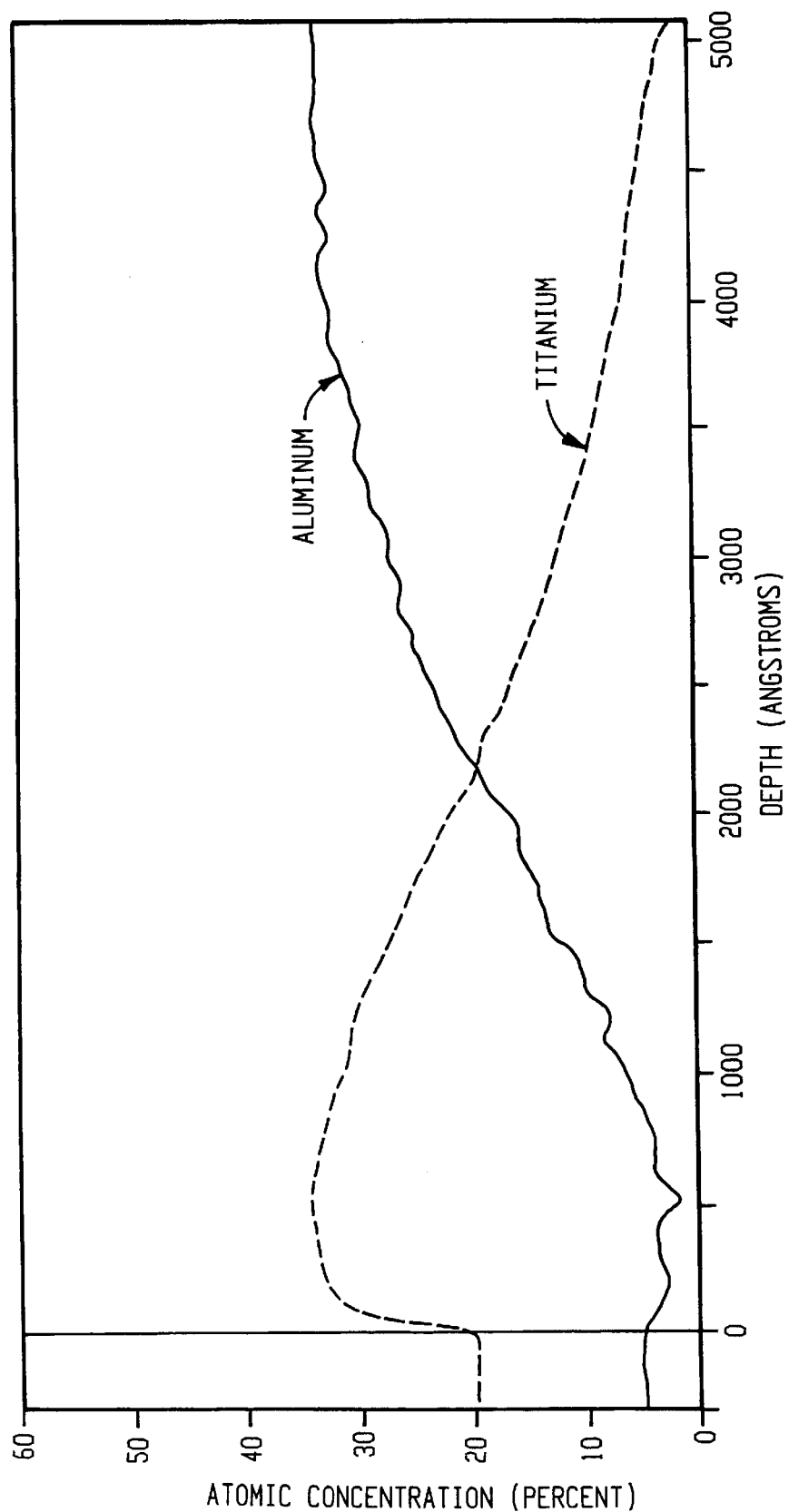
FIG. 3 is an ESCA depth profile demonstrating changes in the concentration of titanium as $Ti_2O_3$ and aluminum as $\alpha$-$Al_2O_3$ with depth from the gas/substrate interface.
Figure 4:
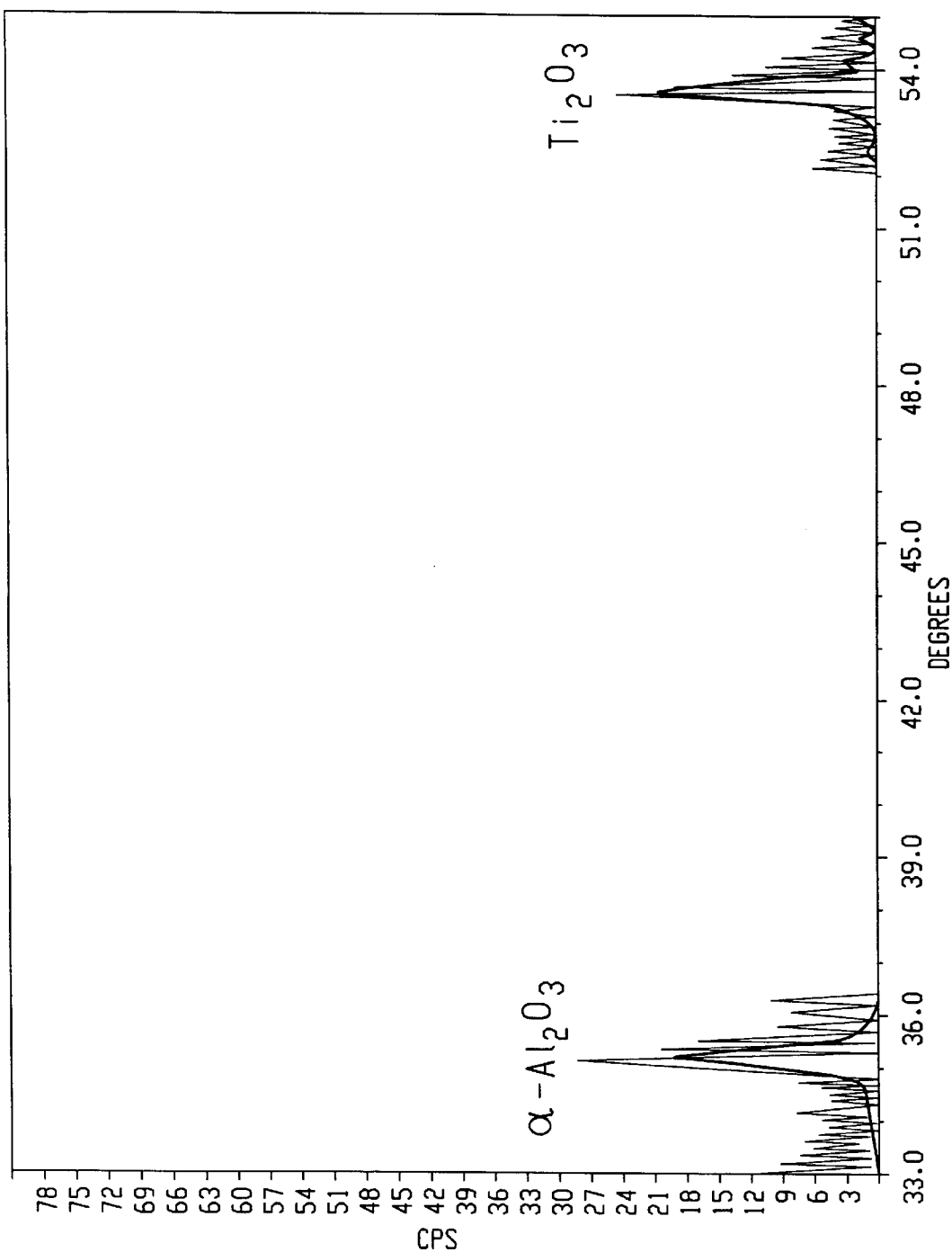
FIG. 4 is an X-ray diffraction study showing only the presence of $\alpha$-$Al_2O_3$ and $Ti_2O_3$ after processing.

The separation of α-$Al_2O_3$ and $Ti_2O_3$ phases and formation of the α-$Al_2O_3$/substrate interface are extremely important discoveries, and can be seen in FIGS. 3 and 4. FIG. 3 is an ESCA depth profile of the immediate oxide coating. As can be seen, the concentration of Ti (as $Ti_2O_3$) is greatest at shallower depths, and the concentration of Al (as $\alpha$-$Al_2O_3$) is greatest closer to the substrate surface. FIG. 4 is an X-ray diffraction study showing the presence of $\alpha$-$Al_2O_3$ and $Ti_2O_3$ on the substrate surface after processing. This separation shows that the present method forms a strongly-bonded $\alpha$-$Al_2O_3$ oxide directly to a titanium-aluminide substrate. The $\alpha$-$Al_2O_3$ prevents oxygen from reaching the substrate. Later, when exposed to an air or oxygen atmosphere at a selected higher temperature, the intermediate oxide, $Ti_2O_3$, concentrated at the oxide/gas interface, converts to $TiO_2$, but only in small quantities, resulting in a very thin film at the surface. Other elements present in the substrate unable to oxidize in the low-oxygen atmosphere, diffuse into the $Ti_2O_3$ region, but remain non-oxidized. The result is a mixed $\alpha$-$Al_2O_3$, $Ti_2O_3$, and non-oxidized element gradient between the gas/oxide interface 12 and the $\alpha$-$Al_2O_3$ oxide barrier 6 on the substrate 4. Such a gradient spreads the load of any applied tensile force over many atom layers making up the thickness of the mixed oxide/non-oxidized element region so that the oxide coating is strongly bonded to the substrate. The $\alpha$-$Al_2O_3$, being the oxide that bonds most strongly to the surface of the substrate, is therefore the actual barrier that prevents oxygen diffusion into the substrate. The relatively thick layer of $Ti_2O_3$ between the $\alpha$-$Al_2O_3$ and the $TiO_2$ layers prevents any contact between $\alpha$-$Al_2O_3$ and $TiO_2$, which could cause brittleness, peeling, and spallation.

At least about 2 weight percent of aluminum must be present in the substrate to form the $\alpha$-$Al_2O_3$/substrate oxygen barrier coating with the preferred process. If this limitation is met, the whole range of variation of aluminum with titanium can produce valid protective oxide coatings. The substrates containing the higher percentages of titanium are preferred for their ability to function at higher temperatures.

In one aspect of the present invention, the thickness of the oxide coating is important in determining the strength of the coating. X-ray diffraction studies and electron spectroscopy for chemical analysis data have shown that the strength of the oxide coating varies with the thickness of the oxide coating. If the coating is too thin, there is not enough protection against oxidation. If the coating is too thick, it becomes somewhat cumbersome and loses adhesion properties. The optimum thickness of the oxide coating, where both protection from oxidation and strong adhesion properties remain intact, is between about 500 and about 1500 nm. Stud pull test show that the present coating can survive an applied tensile stress greater than about 69,000 kPa. These tests were carried out via the use of a Sebastion V unit to try to pull the oxide from the substrate in a pull test in which a tensile pull rod is bonded to the oxide surface by epoxy.

In another aspect of the present invention, a sulfur scavenger is used prior to the formation of the coating. Free sulfur in a bulk substrate diffuses to the surface and condenses in voids or cavities, reducing the bond strength of any oxide present. One of the benefits of the present technique is the very strong bonds formed between $\alpha$-$Al_2O_3$ and the titanium aluminide substrate. These bonds have a strength in excess of 69,000 kPa. Therefore, free sulfur is removed from the surface of the substrate. In the preferred process, a flowing hydrogen gas in a preliminary processing step, at atmospheric pressure, between about 550 and 1100° C., and containing about 1 to about 750 ppm water, preferably containing about 1 to about 500 ppm water vapor, reacts with any sulfur that has condensed in voids or cavities at the surface of a substrate. Another hydrogen producing atmosphere is an inert gas such as helium containing preferably less than about 750 ppm of water vapor which produces hydrogen that also reacts with any sulfur in a similar manner. Still another hydrogen producing atmosphere consists only of water vapor, over a partial pressure range of from about $1\times10^{-6}$ to about $1\times10^{-2}$ kPa, which produces hydrogen that also reacts with any sulfur in a similar manner. The interaction of water vapor with aluminum produces oxygen and hydrogen. The oxygen reacts with aluminum to form $\alpha$-$Al_2O_3$ and the hydrogen is then available to react with sulfur to form hydrogen sulfide—a gas that is removed with the flowing hydrogen.

In another embodiment of the present invention, a repair method for damaged oxide coatings is provided. Damage to the above-mentioned protective oxide coatings in limited regions can be repaired. For example, removal of a small area of oxide may occur by the impact of a high-velocity particle. Or, two previously processed parts may be welded or brazed together, perhaps by laser welding. The resulting weld lacks a proper protective oxide unless the barrier layer formation process is repeated after the weld was completed. Small region repairs are accomplished by heating the locally damaged surface area in the appropriate environment. Such local heating is preferably accomplished by laser-heating procedures.

A scanning mechanism causes a pulsed laser with variable repetitive pulsing rate to sweep in both the X and Y directions over a selected area. The scanning rates of both the X and Y directions are adjusted to provide uniform heating of the damaged or newly welded area, and also to provide a gradient in temperature between the damaged area and the much lower temperature surrounding the oxide protected area. Any laser which operates between ultraviolet and infrared radiation is contemplated. The laser intensity is preferably less than $10^8$ J/sec$^2$ for the ultraviolet wavelengths, and less than $10^{11}$ J/sec$^2$ for the infrared light. For laser wavelengths between the UV radiation and infrared radiation, the limiting intensity varies approximately linearly with wavelength. Above the limiting laser intensities given, ablation of material may occur. Only heating is desired, so laser intensities below these limits may perform best.

Importantly, the area to be repaired is encompassed by the above-described environment. Particularly, the environment is hydrogen gas at atmospheric pressure that contains approximately 1 to about 500 ppm of water vapor. Another alternate atmosphere is an inert gas such as helium at atmospheric pressure that contains approximately 1 to about 500 ppm of water vapor. Still another alternate atmosphere consists only of water vapor, over a partial pressure range of from $1\times10^{-6}$ to $1\times10^{-2}$ kpa.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A process for forming a specific reactive element bilayer barrier on a titanium aluminide substrate, the process comprising:

creating a hydrogen atmosphere with a concentration of water vapor below 750 ppm at a temperature above about 550° C. contiguous to a surface of the titanium aluminide substrate on which the barrier layer is to be formed;

maintaining the temperature above 550° C. and water vapor concentration below 750 ppm; and reacting the gaseous hydrogen/water vapor atmosphere with specific reactive elements at the titanium aluminide substrate surface and with oxygen to form a specific reactive element oxide barrier layer which is strongly bonded to the substrate surface, said barrier layer having an aluminum oxide layer at a substrate/barrier layer interface and a titanium oxide layer at a barrier layer/gas interface.

2. The process of claim 1 wherein: the aluminum oxide layer includes crystalline $\alpha$-$Al_2O_3$; and the titanium oxide layer includes crystalline $Ti_2O_3$, the crystalline $Al_2O_3$ and the crystalline $Ti_2O_3$ having like lattice constants.

3. The process of claim 1 wherein the reacting step includes:

disassociating oxygen in said water vapor; and reacting the disassociated oxygen with said specific reactive elements to form the aluminum and titanium oxide layers.

4. The process of claim 3 wherein the reacting step is performed at a subatmospheric pressure.

5. The process of claim 4 wherein the pressure is between about $1\times10^{-6}$ to $1\times10^{-2}$ kPa.

6. The process of claim 1 wherein the temperature is between 550 and 1100° C.

7. The process of claim 1 wherein the gaseous atmosphere comprises:

hydrogen at atmospheric pressure that contains less than 750 ppm of water vapor.

8. The process of claim 1 wherein the gaseous atmosphere comprises:

an inert gas at atmospheric pressure that contains less than 750 ppm of water vapor.

9. The process of claim 1 wherein the gaseous atmosphere comprises:

water vapor at a pressure between about $1\times10^{-6}$ and $1\times10^{-2}$ kPa.

10. The process of claim 1 wherein the atmosphere creating step includes:

heating a region of the substrate surface with a pulsed laser.

11. The process of claim 10 further including:

controlling an intensity of the laser to hold the substrate below an ablation temperature.

12. The process of claim 11 wherein the laser intensity is below $10^{11}$ Joules/sec$^2$.

13. The process of claim 10 wherein a heated region of the substrate is bordered by substrate surfaces coated with the aluminum oxide layer and the titanium oxide layer.

14. The process of claim 1 further including:

reducing non-specific reactive elements on the surface of said substrate with the hydrogen gas.

15. The process of claim 1 wherein said water vapor in hydrogen is at a concentration of between about 1 and 500 ppm.

16. The process of claim 1 wherein said titanium aluminide substrate comprises at least 2% aluminum.

17. The process of claim 1 wherein said titanium aluminide substrate comprises $TiAl_3$.

18. The product formed by the process of claim 1.

19. The product of claim 18 wherein:

the aluminum oxide layer includes $\alpha$-$Al_2O_3$; and the titanium oxide layer includes $Ti_2O_3$.

20. The product of claim 19 further including:

a $TiO_2$ layer formed on the $Ti_2O_3$ layer.

21. The product of claim 19 wherein the oxide layers and the substrate adjacent the aluminum oxide layer are substantially free of sulfur.

22. The product of claim 19 wherein the $Ti_2O_3$ layer includes non-oxidized metals.

23. The product of claim 19 wherein a bond strength between layers is greater than 69,000 kPa.

24. A process for forming a specific reactive element bilayer barrier on a titanium aluminide substrate, the process comprising:

creating a gaseous hydrogen/water vapor atmosphere with a concentration of water vapor below 750 ppm at a temperature above about 550° C. contiguous to a surface of the titanium aluminide substrate on which the barrier layer is to be formed;

while maintaining the temperature above about 550° C. and water vapor concentration below 750 ppm, reacting the gaseous hydrogen/water vapor atmosphere with specific reactive elements at the titanium aluminide substrate surface and with until:

$\alpha$-$Al_2O_3$ is formed directly on the substrate surface in preference to titanium oxide to form an $\alpha$-$Al_2O_3$ layer at a substrate/barrier layer interface;

titanium atoms from titanium oxide are reduced with aluminum and the titanium atoms difuse outward through the $\alpha$-$Al_2O_3$ layer; and the titanium atoms that have diffused through the $\alpha$-$Al_2O_3$ layer are oxidized to form a $Ti_2O_3$ layer at a barrier layer/gas interface.

25. The process of claim 24 further including:

diffusing other metals in the substrate through the $\alpha$-$Al_2O_3$ layer into the $Ti_2O_3$ layer in non-oxidized state.

26. The process of claim 24 further including:

oxidizing $Ti_2O_3$ at a gas/barrier layer interface surface of the $Ti_2O_3$ layer to form a $TiO_2$ layer on the $Ti_2O_3$ layer such that immiscible layers of $TiO_2$ and $\alpha$-$Al_2O_3$ are separated by $Ti_2O_3$.

27. The process of claim 24 further including:

reacting sulfur at the substrate surface with the hydrogen to form hydrogen sulfide gas; and removing the hydrogen sulfide gas from the substrate surface.

28. A barrier layer protected titanium aluminide material comprising:

a titanium aluminide substrate;

an $\alpha$-$Al_2O_3$ layer bonded to a surface of the titanium aluminide substrate;

a $Ti_2O_3$ layer bonded to the $\alpha$-$Al_2O_3$ layer.

29. The titanium aluminide material of claim 28 further including:

a $TiO_2$ layer bonded to the $Ti_2O_3$ layer.

* * * * *